United States Patent [19]

Attard et al.

[11] Patent Number: 5,336,318
[45] Date of Patent: Aug. 9, 1994

[54] CLAY-FREE, ASBESTOS-FREE AND GLASS MICROBUBBLE-FREE DRYING TYPE JOINT COMPOUNDS

[75] Inventors: Peter M. Attard, Elk Grove Village; Therese A. Espinoza, Wood Dale, both of Ill.

[73] Assignee: United States Gypsum Company, Chicago, Ill.

[21] Appl. No.: 25,613

[22] Filed: Mar. 3, 1993

Related U.S. Application Data

[63] Continuation-in-part of Ser. No. 583,845, Sep. 17, 1990, abandoned.

[51] Int. Cl.$^5$ .................. C04B 11/00; C04B 28/14
[52] U.S. Cl. .................... 106/780; 106/698; 106/701; 106/778; 106/DIG. 2; 252/378 P; 524/650
[58] Field of Search ............ 106/698, 701, 711, 732, 106/735, 778, 780, DIG. 2; 252/378 P; 524/2, 650

[56] References Cited

U.S. PATENT DOCUMENTS

| | | | |
|---|---|---|---|
| Re. 29,753 | 9/1978 | Williams | 106/85 |
| 3,297,601 | 1/1967 | Maynard et al. | 260/17.4 |
| 3,386,223 | 6/1968 | Wegwerth | 52/741 |
| 3,713,868 | 1/1973 | Gordon et al. | 427/244 |
| 3,867,335 | 2/1975 | Reed et al. | 260/42.52 |
| 3,869,415 | 3/1975 | Williams | 106/778 |
| 3,891,453 | 6/1975 | Williams | 106/85 |
| 3,907,725 | 9/1975 | Forte et al. | 206/17 R |
| 3,947,398 | 3/1976 | Williams | 427/258 |
| 4,126,599 | 11/1978 | Sugahara et al. | 106/778 |
| 4,238,239 | 12/1980 | Brown | 106/116 |
| 4,286,995 | 9/1981 | Smith et al. | 106/778 |
| 4,294,622 | 10/1981 | Brown | 106/314 |
| 4,370,167 | 1/1983 | Mudd | 106/119 |
| 4,413,026 | 11/1983 | Sherno | 427/407.1 |
| 4,454,267 | 6/1984 | Williams | 252/378 P |
| 4,600,761 | 7/1986 | Ruffner et al. | 526/270 |
| 4,616,074 | 10/1986 | Ruffner | 526/318 |
| 4,746,365 | 5/1988 | Babcock et al. | 106/695 |
| 4,824,879 | 4/1989 | Montgomery et al. | 524/43 |
| 4,849,018 | 7/1989 | Babcock et al. | 106/695 |
| 4,944,804 | 7/1990 | Schilling | 106/669 |

OTHER PUBLICATIONS

Alco Chemical Corp.-"ALCOGUM L-15"; May 19, 1987.
Alco Chemical Corp.-"ALCOGUM L-35"; May 19, 1987.
Alco Chemical Corp.-"ALCOGUM SL-65"; Jan. 20, 1988.
Alco Chemical Corp.-"Alcogum SL-Series Thickeners in Ready Mix Joint Cement"; Mar. 28, 1989.
Alco Chemical Corp.-"ALCOGUM L Thickeners"; Aug. 5, 1993.
Alco Chemical Corp.-"ALCOGUM L-11"; May 19, 1987.

Primary Examiner—Mark L. Bell
Assistant Examiner—Michael Marcheschi
Attorney, Agent, or Firm—Robert H. Robinson; John M. Lorenzen

[57] ABSTRACT

A clay-free, asbestos-free and glass microbubble-free, drying type Joint compound containing an in-situ or associative thickener as a substitute for asbestos and any clay substitute therefor. In particular, these drying type joint compounds contain no attapulgus clay thereby improving viscosity stability, crack resistance and shrinkage. The lightweight joint compounds contain treated expanded perlite, treated to render it water-insensitive. The preferred in-situ thickeners are acidic acrylate copolymers. It has been found that the in-situ thickeners should be used in combination with the normal cellulosic thickeners used in joint compounds Instead of as replacements therefor. The joint compounds contain the usual fillers and latex emulsion binders, with at least about 50% by weight of the drying type joint compound being a filler selected from the group consisting of calcium carbonate and calcium sulfate dihydrate.

20 Claims, No Drawings

CLAY-FREE, ASBESTOS-FREE AND GLASS MICROBUBBLE-FREE DRYING TYPE JOINT COMPOUNDS

This application Is a continuation-in-part of U.S. patent application Ser. No. 583,845, filed on Sept. 17, 1990 which was abandoned subsequent to the filing of this application.

BACKGROUND OF THE INVENTION

Walls made from gypsum wallboard are conventionally constructed by attaching the wallboard panels to studs, and filling and coating the joints between the panels with a specially formulated composition called a joint compound. The wetted joint compound (taping grade) is placed within the joint formed by the abutting edges of the wallboard panels, and a fiberglass or paper reinforcing tape is embedded with the joint compound which is then permitted to dry. When the joint compound is dry, a second joint compound (topping grade) is applied over the joint, and it too Is permitted to dry. Thereafter, the joint compound may be lightly sanded and the wall may be conventionally finished with a decorative coating (paint or wallpaper); or if necessary to completely hide the joint, there may be a third application of a joint compound, and after it is dry, it may be lightly sanded and a decorative coating applied to the wall. Instead of using two grades of joint compound, an all purpose joint compound is commercially available which is used both for embedding the tape and for the finish coat(s).

Conventionally, all joint compounds contain a filler, a binder and a thickener. The taping grade joint compound generally contains more binder than the topping grade. The conventional fillers are calcium carbonate, calcium sulfate dihydrate (gypsum), and calcium sulfate hemihydrate (plaster of Paris). The calcium sulfate hemihydrate is used only in setting type joint compound as disclosed in U.S. Pat. No. 3,297,601. However, in current construction practices, it is preferred to use a ready mixed or pre-wetted joint compound which contains either a calcium carbonate or gypsum filler.

As disclosed In U.S. Pat. No. 3.891,453, reissued as U.S. Pat. No. Re. 29,753, for many years joint compounds contained asbestos as a key ingredient. Asbestos provided nonleveling, slip and water retention; however, as a result of a health hazard, asbestos was removed from joint compounds many years ago. The most commercially successful substitute for asbestos in joint compounds Is attapulgus clay, as claimed in U.S. Pat. No. Re. 29,753. Attapulgus clay does provide a joint compound having working properties similar to those of joint compounds which contained asbestos, but there are also adverse effects resulting from the use of attapulgus clay. It has been found that attapulgus clay adversely affects crack resistance and the viscosity stability of ready mixed joint compounds. U.S. Pat. No. 4,370,167 discloses the use of sepiolite clay as an asbestos replacement in joint compound properties and it is believed that the sepiolite clay also adversely affects joint compound.

As mentioned above, most commercial joint compound formulations contain a thickener, usually a cellulosic material. Some joint compound formulators dislike the relatively slow hydrating cellulosic thickeners and the high viscosity provided thereby, and some chemical suppliers are recommending liquid thickeners to reduce batch lumping tendencies and the longer mixing times which are associated with dry powder cellulosic thickeners. In-situ or associative thickener emulsions have been recommended as a substitute for cellulosic thickeners in joint compounds. These associative thickeners are supplied as stable latex emulsions which are reactive, acidic thickening agents. The addition of an alkaline agent neutralizes the acidic groups whereby a clear, viscous solution is formed which is an effective thickener for many joint compound formulations.

A further development in joint compounds is disclosed in U.S. Pat. No. 3,386,223 wherein glass (inorganic) microbubbles are incorporated into the composition. The purpose of these glass microbubbles is to provide a joint compound having little or no shrinkage upon the drying of the compound after application to a wall or ceiling surface.

U.S. Pat. No. 4,454,267 discloses a lightweight joint compound for use in finishing joints between gypsum wallboards, comprising a filler, a binder, a specially treated expanded perlite, a non-leveling agent, and a thickener. Attapulgus clay is the non-leveling agent which provides slip and thixotropic properties. The expanded perlite, treated to render it water-insensitive, provides the lightweight property.

SUMMARY OF THE INVENTION

This invention comprises the discovery that a clay-free, asbestos-free and glass microbubble-free, drying type joint compound can be formulated using an in-situ or associative thickener as a substitute for attapulgus clay or other clay ingredient in the joint compound. Contrary to earlier teachings, the cellulosic thickeners remain in the joint compound formulation providing body and workability. The joint compounds of this invention have excellent viscosity stability and Improved crack resistance resulting from the removal of attapulgus clay, and good shrinkage characteristics without the costly microbubbles.

It is an object of this Invention to provide a drying type joint compound which does not contain asbestos or clay substitute therefor which has working properties comparable to joint compounds containing asbestos or a clay substitute therefor.

It is another object of the invention to provide a ready mixed joint compound having excellent viscosity stability resulting from the removal of attapulgus clay from the formulation.

It is a further object of this Invention to provide a drying type joint compound having Improved crack resistance and low shrinkage whereby ingredients such as mica and glass microbubbles may be omitted from the formulation.

A still further object of this Invention is to provide a lightweight, drying type joint compound having Improved crack resistance.

Other objects and advantages of the drying type joint compounds of this invention will become apparent in view of the following description of the preferred embodiments.

DESCRIPTION OF THE PREFERRED EMBODIMENTS

It has been discovered that the presence of attapulgus clay In ready mixed joint compound adversely affects the viscosity stability of the compound, particularly at high temperatures, i.e. higher than 80° F. Furthermore, the attapulgus clay also adversely affects the crack resistance of drying type joint compounds. It has now been found that both asbestos and attapulgus clay can be removed from the joint compound formulation and still achieve good workability by incorporating an in-situ or associative thickener in the joint compound. Whereas suppliers of these in-situ thickeners have previously recommended their use in joint compounds as substitutes for cellulosic thickeners, it has now been discovered that they are useful in drying type joint compounds as substitutes for attapulgus clay. In addition, the joint compounds of this invention have low shrinkage without requiring the costly glass microbubbles.

The drying type joint compound compositions of this Invention contain no asbestos and no attapulgus clay or other clay ingredient such as bentonite or sepiolite. The joint compound composition may contain the following ingredients:

| Ingredient | Physical State |
| --- | --- |
| Filler (Calcium Carbonate) | Dry Powder |
| Thickener (Cellulosic) | Dry Powder |
| Modified Cellulose Ether | Dry Powder |
| Modified Starch Binder | Dry Powder |
| Alpha Cellulose Fiber | Dry Powder |
| Talc | Dry Powder |
| Treated Expanded Perlite | Dry Powder |
| Polyvinyl Alcohol | Dry Powder |
| pH Modifier (alkali) | Dry Powder |
| Binder (Latex Emulsion) | Liquid Emulsion |
| In-Situ/Associative Thickener | Liquid Emulsion |
| Preservatives | Liquid |
| Water | Liquid |

The key ingredient in the drying type joint compound composition is the in-situ or associative thickener. This term refers to the acidic polymer emulsion which is added to the joint compound composition to replace the attapulgus clay. It functions as a thickener and pseudoplasticity agent by reacting with the alkaline materials present in the joint compound which neutralize the acidic groups present in the thickener to form a clear, viscous solution.

The latex emulsion binder used in the joint compound may be an ethylene vinyl acetate or a polyvinyl acetate latex which is also acidic. The acidic in-situ thickener readily mixes with the binder and no thickening occurs. However, when the liquid preservatives, which are alkaline, and the filler (calcium carbonate), also alkaline, are added to the in-situ thickener blended with the latex binder, the pH of the composition increases. Thickening occurs when sufficient alkali has been added to place the pH in the range of 8–10. In some cases, it may be necessary to incorporate a pH modifier (alkali) such as sodium hydroxide, hydrated lime, ammonium hydroxide or magnesium oxide, into the composition to achieve the pH range of 8–10.

Normally, the In-situ thickener is added in an amount which will give the desired viscosity based on trial or experience. For the joint compounds of this invention, it is generally preferred that the joint compound have a viscosity in Brabender units ranging from about 400 to about 700 which requires from about 0.1 to about 2% by weight of the in-situ thickener. If required, final viscosity adjustment can be made by successive careful additions of small amounts of in-situ thickener and pH modifier. Excessive amounts of in-situ thickener may cause poor bond strength, stickiness when troweled or too much flow, i.e. the compound drips off the tools.

The preferred in-situ thickeners are acidic acrylate copolymers. The preferred thickener is a cross-linked acrylic emulsion copolymer of ethyl acrylate and methacrylic acid. Acrylic emulsion terpolymers (cross-linked) of ethyl acrylate, methacrylic acid and a non-ionic urethane surfactant monomer have been found useful in the joint compound compositions. The preparation of these in-situ thickeners is disclosed in U.S. Pat. Nos. 4,600,761 and 4,616,074.

Contrary to the teachings of the prior art, it has been found that the in-situ thickeners should be used In combination with the cellulosic thickeners instead of as replacements therefor. The conventional cellulosic thickeners, e.g. ethylhydroxy ethylcellulose, hydroxypropyl methylcellulose, methylhydroxypropyl cellulose and hydroxyethyl cellulose, may be used in the joint compounds of this invention. The amount of cellulosic thickener may range from about 0.1% to about 2% of the weight of the total joint compound ingredients (not including the water present in the binder, in-situ thickener, and the preservatives and the water added to make it a ready mix compound, which hereinafter will be referred to as "dry weight").

The other ingredients present in the drying type joint compound compositions of this Invention are conventional and are well known to those skilled in the joint compound art. The latex emulsion binder is an Important ingredient into which the in-situ thickener may be blended prior to mixing with the dry powder ingredients. Any of the well known latex binders may be used with polyvinyl acetate and ethylene vinyl acetate emulsions being preferred. In general, the latex binder ranges from about 1% to about 7% of the total dry weight.

In addition to the latex emulsion binder, it is preferred that the joint compound composition also contain a minor amount of a modified starch binder. The starch binder improves joint compound workability. It also improves bond strength, both the strength of the bond to paper and the strength of the joint compound per se. The modified starch binder is usually present in only minor amounts, generally ranging from about 0.05% to about 5% of the total dry weight. Another dry ingredient which may be present in the drying type joint compound compositions of this invention is a modified cellulose ether. The modified cellulose ether is a hydrophobically modified hydroxyethyl cellulose which contributes to improved workability of the joint compound. Workability is defined as the ability of the joint compound to be manually troweled onto wallboard and involves such properties as slip (the ability to spread smoothly in a frictionless manner without drag) and resistance to flow (non-dripping off the tools). The modified cellulose ether is present in minor amounts, generally ranging from about 0.05% to about 2% of the total dry weight.

Conventional ready mixed joint compounds frequently contain mica, talc and/or sericite to provide resistance to cracking upon drying. These ingredients can be omitted from the drying type joint compounds of this invention which have excellent resistance to cracking without using mica or talc; however, it may be desired to include minor amounts of mica or talc in the formulation to provide improved slip and workability. When used in the joint compounds of this invention, the mica or talc may be between about 2% and about 15% of the total dry weight. As previously noted, the joint compounds of this invention contain no glass microbubbles. In the lightweight compounds, it is preferred to incorporate a small amount (up to about 2% by weight) of alpha cellulose fiber.

Additional ingredients frequently used in joint compounds are preservatives, wetting agents, defoamers and plastIclzers. For example, "FUNGITROL 158" is a fungicide made by Huls America, Inc. which may be added to the joint compound. "TROYSAN 174" is a preservative made by the Troy Chemical Company which is used for in-can preservation of the ready mixed joint compound. These ingredients are also used in minor amounts generally ranging from about 0.05 to about 1% of the total dry weight.

If a lightweight drying type joint compound having improved crack resistance is desired, the lightweight property can be provided by incorporating the specially treated expanded perlite into the formulation in accordance with the teachings of U.S. Patent No. 4,454,267. it is well known in the art that the expanded perlite should have a particle size which will pass through a 100 mesh screen if it is to be incorporated into a joint compound. The expanded perlite is a very lightweight material which contains many fine cracks and fissures which may be penetrated by water thereby destroying its ability to render the joint compound lightweight. As a result, the expanded perlite must be treated to render it water-insensitive. There are several ways to render the expanded perlite water-insensitive, one of which is disclosed in U.S. Pat. No. 4,525,388. The preferred method is to treat the expanded perlite with a silicone compound but other materials may be used to render it water-insensitive. The specially treated expanded perlite is commercially available from suppliers such as Silbrico Corporation.

In order to achieve the desired lightweight properties, the treated expanded perlite should be present in amounts of at least about 5% by weight of all of the ingredients in the joint compound, excluding the water. It is particularly preferred that the treated expanded perlite be present in amounts of at least about 10% by weight of all of the ingredients in the joint compound, excluding the water. As previously noted, it is also preferred that the lightweight compound contain up to about 2% by weight of an alpha cellulose fiber.

In preparing the lightweight, drying type joint compound, it has been found that the acidic acrylate copolymer in-situ thickener causes the viscosity of the composition to increase too rapidly if it is mixed into the other liquid ingredients prior to adding the dry ingredients, thereby making it very difficult to mix the composition. Therefore, it is preferred to add the in-situ thickener last, after the dry ingredients have been added to the initial water and the other liquid ingredients. The dry ingredients are not pre-mixed but are added sequentially to a feeder box which feeds the dry powders to the liquid ingredients in the mixer.

As previously noted, the preferred viscosity of the joint compound compositions generally ranges from about 400 to about 700 Brabender units. For the lightweight joint compounds, the preferred viscosity ranges from about 450 to about 650 Brabender units. The viscosity is measured on a VC-3 Brabender viscometer which is commercially available. Viscosity is measured at room temperature (about 25° C.) using a 250 centimeter-gram torsion head operated at a 75–78 r.p.m. spindle speed. Of course, the amount of water added to form a ready mixed joint compound or a wetted joint compound mixed on site will depend on the desired viscosity. In general, the joint compounds of this invention have lower water demand than prior art commercial formulations.

In preparing the drying type joint compound compositions, it is generally preferred to add the dry ingredients sequentially to a feeder box which feeds the dry powders to the initial water and the other liquid ingredients which are being blended in a low shear mixer. The joint compound compositions of this invention are of the drying type, wherein the filler is usually selected from calcium carbonate or calcium sulfate dihydrate. The preferred filler is finely ground calcium carbonate. The filler is a dry powder which usually comprises at least about 50% by weight of the joint compound composition and generally falls within the range of about 50–95% by weight. In order to activate the in-situ thickener, the pH of the composition should be in the range of 8–10. The filler is the principal alkaline ingredient, and thererefore, the blended dry powder ingredients are slowly added to the liquid portion with constant agitation until a smooth blend is obtained. A major portion of the water is usually added to the mixer prior to the addition of the dry powder ingredients. If necessary to achieve the proper pH, a pH modifier may be added to increase the alkalinity of the composition. As in the case of the lightweight compounds, it is preferred to add the in-situ thickener last, after the dry ingredients have been fed to the mixer.

In compliance with the requirements of 35 U.S.C. 112, the following operating examples disclose the best mode for carrying out the invention known to the inventors at this time.

EXAMPLE 1

The following joint compound formulation was prepared in the laboratory:

| Ingredient | % by dry weight | Amount |
| --- | --- | --- |
| Calcium Carbonate Filler | 94.55 | 945.15 g. |
| Hydroxypropyl Methylcellulose (METHOCEL 240-S) | 0.35 | 3.5 g. |
| Modified Cellulose Ether (AQUA-D 3082) | 0.15 | 1.5 g. |
| Modified Starch Binder (STA-JEL 136) | 0.15 | 1.5 g. |
| Talc (Vertal 15 G) | 3.0 | 30 g. |
| In-Situ Thickener (ALCOGUM L-11) | 0.2 | 2 g. |
| Latex Emulsion Binder (ELVACE 40-716) | 1.5 | 27 g. |
| Liquid Preservative (FUNGITROL 158) | 0.05 | 0.5 g. |
| Liquid Preservative (NUOSEPT 91) | 0.075 | 0.75 g. |

This formulation required about 400 cc of water to provide a viscosity in the range of 500–550 Brabender units. The amount of the latex emulsion binder is calculated on the basis of the solids content of the liquid. This joint compound composition had good viscosity stability in accelerated oven agings and freeze/thaw cycling. When applied to gypsum wallboard as a joint compound, it had excellent crack resistance, with no cracking at 1/8 inch deep fills.

EXAMPLE 1

The following formulation was prepared at a plant and tested for joint compound properties:

| Ingredient | Amount (lbs.) |
| --- | --- |
| Calcium Carbonate (HUBERCARB No. 3) | 1893 |
| Hydroxypropyl Methylcellulose (METHOCEL 240-S) | 7 |

| Ingredient | Amount (lbs.) |
| --- | --- |
| Modified Cellulose Ether (AQUA-D 3082) | 3 |
| Modified Corn Starch (STA-JEL 136) | 3 |
| Talc (VERTAL 15 G) | 60 |
| In-Situ Thickener (ALCOGUM L-11) | 4 |
| Ethylene Vinyl Acetate Emulsion (ELVACE 40-716) | 55 |
| Liquid Preservative (FUNGITROL 158) | 1 |
| Liquid Preservative (NUOSEPT 91) | 1.5 |
| Water | 790 |

In preparing this joint compound formulation, the initial water was 750 lbs., with 10 additional lbs. added during mixing. This yielded a viscosity of 600 Brabender units. After 24 hours, there was a slight viscosity increase to 620 Brabender units, and 30 lbs. of water were added to yield a final viscosity of 500 Brabender units. The joint compound was tested for percent drying shrinkage per ASTM C474-87 and was determined to have 17.1%. In the 1/8 inch crack test, there were none. It had good bond strength, and upon application to a gypsum wallboard joint, it had a soft, light feel and a slick buttery spread.

EXAMPLE 3

The following joint compound formulation was prepared at a plant for a field trial evaluation:

| Ingredient | Amount (lbs.) |
| --- | --- |
| Calcium Carbonate (MARBLE #9 NCS) | 1893 |
| Methylhydroxypropyl cellulose (CULMINAL 20000PFR | 7 |
| Modified Cellulose Ether (AQUA-D 3082) | 3 |
| Modified Corn Starch (STA-JEL 136) | 3 |
| TALC (VERTAL 15 G) | 60 |
| In-Situ Thickener (ALCOGUM L-11) | 4 |
| Ethylene Vinyl Acetate Emulsion (ELVACE 40-716) | 55 |
| Liquid Preservative (FUNGITROL 158) | 1 |
| Liquid Preservative (TROYSAN 174) | 1 |
| Water | 805 |

In preparing this joint compound, the initial water used was 780 lbs. which yielded a viscosity of 650 Brabender units. After 24 hours, the viscosity had not changed, whereupon 25 lbs., of water was added to yield a final viscosity of 525 Brabender units. This joint compound was tested for percent drying shrinkage per ASTM C474-87 and was found to have 19.2%. In the 1/8 inch crack test, there were none. Upon application to a gypsum wallboard joint, the joint compound was soft, light and free, and had good bond strength.

This joint compound composition was evaluated in field trials in the Pittsburgh, Pennsylvania area and was well received. One applicator commented that it applied better than commercially available joint compounds, it provided a slick and smooth finish after troweling and felt smooth to the touch after drying. There was minimal shrinkage and excellent crack resistance.

Another applicator evaluated this joint compound in a bazooka taping tool. After thinning the composition for application by this tool, the applicator said that the compound went through the tool very easily, wipe down was excellent with good open time, and it hung well on the tools.

A third applicator used a "banjo" taping tool and found the wipedown on the tape to be excellent with good slip, and the joint compound stayed on the tools and was easy to control. The compound showed no cracking upon drying even on deep fills (up to 3/4 inch) and had good coverage due to no cracking and minimal shrinkage on drying.

EXAMPLE 4

The following joint compound formulation has been developed as a ready mixed topping compound:

| Ingredient | Weight % | Amount (lbs.) |
| --- | --- | --- |
| Calcium Carbonate | 92.695 | 4585 |
| Delaminated Kaolin Clay (SNOW-CAL 50) | 5.1 | 250 |
| Modified Starch Binder (STA-JEL 136) | 0.35 | 17 |
| Hydroxypropyl Methylcellulose (METHOCEL 240S) | 0.25 | 12.25 |
| Ethylhydroxy Ethylcellulose (BERMOCOL E451FQ) | 0.1 | 5 |
| Magnesium Oxide | 0.05 | 2.25 |
| Pigment (Mapico Yellow) | 0.04 | 2 |
| Polyvinyl Acetate Latex (UCAR 133) | 1.215 | 100.1 (11 gal.) |
| In-Situ Thickener (ALCO L-11) | 0.1 | 5 |
| Bacteriacide (TROYSAN 174) | 0.05 | 2.25 |
| Fungicide (FUNGITROL 158) | 0.05 | 2.25 |
| Water | | 1755 (210 gal.) |

The kaolin clay in the above formulation is a non-swelling filler grade clay used only to slightly modify application properties. It does not function as a substitute for asbestos. The magnesium oxide was added to increase the pH of the composition by neutralizing the acidic groups present in the in-situ thickener.

EXAMPLE 5

The following joint compound formulation has been developed as a ready mixed, lightweight, topping compound:

| Ingredient | Weight % | Amount (lbs.) |
| --- | --- | --- |
| Calcium Carbonate | 80.8 | 1616 |
| Hydroxypropyl Methylcellulose (METHOCEL 250S) | 0.9 | 18 |
| Alpha Cellulose Fiber (KAYOCEL 55 HC) | 1.5 | 30 |
| Treated Expanded Perlite (SILCEL 42-23) | 10.2 | 204 |
| Modified Starch Thickener (STARPOL 480) | 0.4 | 8 |
| Polyvinyl Acetate Latex Binder (UCAR 133-60% solids) | 5.5 | 110 (solids) |
| Acrylic Emulsion In-situ Thickener (ALCO L-11) | 0.4 | 8 |
| Fungicide (FUNGITROL 158) | 0.1 | 2 |
| Bacteriacide (NUOSEPT 91) | 0.1 | 2 |
| Lime | 0.1 | 2 |
| | 100% | 2000 |
| Water | | 1520 (183 gal.) |

Normal mixing methods may be used, combining the liquid ingredients first, except the in-situ thickener, and then adding the dry ingredients. The polyvinyl acetate latex and preservatives are added to the initial water (approximately 145 gallons), and then the dry ingredients are sequentially fed to the mixer via a fluffer box. After all of the dry ingredients are added, the acrylic emulsion in-situ thickener is added to the composition and thoroughly mixed therein. The preferred viscosity after 24 hours is between about 500 and 600 Brabender units.

The resulting topping compound is lightweight, has superior crack resistance, more resistance to cratering and lower drying shrinkage.

EXAMPLE 6

The following joint compound formulation has been developed as a ready mixed, lightweight, topping compound:

| Ingredient | Weight % | Amount (lbs.) |
|---|---|---|
| Calcium Carbonate | 79.15 | 1583 |
| Hydroxypropyl Methylcellulose (METHOCEL 250 S) | 0.9 | 18 |
| Alpha Cellulose Fiber (KAYOCEL 55 HC) | 1.5 | 30 |
| Treated Expanded Perlite (SILCEL 35-23) | 10.8 | 216 |
| Modified Starch Thickener (STARPOL 480) | 0.4 | 8 |
| Polyvinyl Acetate latex binder (UCAR 133-60% solids) | 6.5 | 130 (solids) |
| Acrylic Emulsion In-Situ Thickener (ALCO L-11) | 0.4 | 8 |
| Fungicide (FUNGITROL 158) | 0.1 | 2 |
| Bacteriacide (NUOSEPT 91) | 0.15 | 3 |
| Lime | 0.1 | 2 |
|  | 100.00 | 2000 |
| Water |  | 1410 (170 gal.) |

Normal mixing methods may be used, combining the liquid ingredients first except the in-situ thickener, and then adding the dry ingredients. The polyvinyl acetate latex and preservatives are added to the initial water (approximately 130 gallons), and then the dry ingredients are sequentially fed to the mixer via a fluffer box. After all of the dry ingredients are added, the in-situ thickener is added to the composition with continued mixing. The viscosity after 24 hours should range between 450 and 650 Brabender units. This topping compound in lightweight form has superior crack resistance, more resistance to cratering and lower drying shrinkage than standard lightweight all purpose, ready mixed joint compounds.

Having completely described this invention, what is claimed is:

1. A composition which forms a drying type joint compound when mixed with water suitable for use in finishing joints between gypsum wallboards, said composition being free of asbestos and any clay substitute therefor, and containing no glass microbubbles, comprising at least about 50% by weight of a filler selected from the group consisting of calcium carbonate and calcium sulfate dihydrate, a binder, a cellulosic thickener and an acidic acrylate copolymer in-situ thickener.

2. The composition of claim 1 in which the filler is calcium carbonate.

3. The composition of claim 2 in which the in-situ thickener is an acrylic emulsion copolymer of methacrylic acid and ethyl acrylate.

4. The composition of claim 2 which contains at least about 5% by weight of an expanded perlite treated to render it water insensitive whereby the composition is a lightweight joint compound.

5. The composition of claim 1 which contains from about 0.1 to about 2% by weight of the in-situ thickener and from about 0.1 to about 2% by weight of the cellulosic thickener.

6. The wetted composition of claim 5 having a viscosity ranging between about 400 to about 700 Brabender units and a pH in the range of 8-10.

7. in a composition comprising at least about 50% by weight of a filler selected from calcium carbonate and calcium sulfate dihydrate, which forms a drying type joint compound when mixed with water suitable for use in finishing joints between gypsum wallboards, said composition being free of asbestos and any clay substitute for asbestos and containing no glass microbubbles, the improvement comprising incorporating a cellulosic thickener and an in-situ thickener in the composition to provide the composition with those properties normally provided by asbestos or the clay substitutes for asbestos.

8. The composition of claim 7 in which the filler is calcium carbonate and the in-situ thickener is an acidic acrylate copolymer.

9. The composition of claim 8 in which the in-situ thickener is an acrylic emulsion copolymer of methacrylic acid and ethyl acrylate.

10. The composition of claim 8 which contains at least about 5% by weight of an expanded perlite treated to render it water insensitive whereby the composition is a lightweight joint compound.

11. The composition of claim 8 which contains from about 0.1 to about 2% by weight of the in-situ thickener and from about 0.1 to about 2% by weight of the cellulosic thickener.

12. A drying type joint compound composition containing no asbestos or clay substitute therefor consisting essentially of at least 50% by weight of a filler selected from the group consisting of calcium carbonate and calcium sulfate dihydrate, latex emulsion binder, a cellulosic thickener, and an acidic acrylate copolymer in-situ thickener.

13. The composition of claim 12 wherein the in-situ thickener is an acrylic emulsion copolymer of methacrylic acid and ethyl acrylate which is present in the composition in an amount ranging from about 0.1 to about 2% by weight.

14. The composition of claim 12 which contains at least about 5% by weight of an expanded perlite treated to render it water insensitive whereby the composition is a lightweight joint compound.

15. The wetted composition of claim 13 having a viscosity ranging between about 400 to about 700 Brabender units and a pH in the range of 8-10.

16. A ready-mixed, drying type joint compound composition containing no asbestos or clay substitute therefor consisting essentially of the following ingredients:
water;
at least about 50% by weight of a filler selected from the group consisting of calcium carbonate and calcium sulfate dihydrate;
a cellulosic thickener; and
an acidic acrylate copolymer in-situ thickener,
said composition having a pH in the range of 8-10.

17. The composition of claim 16 in which the in-situ thickener is an acrylic emulsion copolymer of methacrylic acid and ethyl acrylate.

18. The composition of claim 16 which contains at least about 5% by weight of an expanded perlite treated to render it water insensitive whereby the composition is a lightweight joint compound.

19. The composition of claim 16 which has a viscosity ranging between about 400 to about 700 Brabender units.

20. The composition of claim 18 which also contains up to about 2% by weight of an alpha cellulose fiber.

* * * * *